(12) United States Patent
Paritsky et al.

(10) Patent No.: US 8,770,024 B1
(45) Date of Patent: Jul. 8, 2014

(54) FIBER OPTIC ACCELEROMETER

(71) Applicant: Vibrosound Ltd, Mazor (IL)

(72) Inventors: Alexander Paritsky, Modiin (IL);
Alexander Kots, Ashdod (IL); Yuvi Kahana, Rinatya (IL)

(73) Assignee: Vibrosound Ltd. (IL)

( * ) Notice: Subject to any disclaimer, the term of this patent is extended or adjusted under 35 U.S.C. 154(b) by 0 days.

(21) Appl. No.: 13/935,955

(22) Filed: Jul. 5, 2013

(51) Int. Cl.
*G01P 15/093* (2006.01)

(52) U.S. Cl.
USPC .................. 73/514.26; 250/227.14

(58) Field of Classification Search
USPC ........................ 73/514.26, 653; 250/227.14
See application file for complete search history.

(56) References Cited

U.S. PATENT DOCUMENTS

| | | | | |
|---|---|---|---|---|
| 4,414,471 A | * | 11/1983 | Rines | 250/227.14 |
| 5,276,322 A | * | 1/1994 | Carome | 250/227.21 |
| 5,771,091 A | * | 6/1998 | Paritsky et al. | 356/4.01 |
| 2007/0247613 A1 | * | 10/2007 | Cloutier et al. | 356/28 |
| 2009/0123112 A1 | * | 5/2009 | Kahana et al. | 385/13 |

* cited by examiner

*Primary Examiner* — John Chapman, Jr.
(74) *Attorney, Agent, or Firm* — Workman Nydegger

(57) ABSTRACT

A fiber optic accelerometer has a hollow body that supports an optical fiber therein so as to form a cantilever section, a fiber optic splitter coupled to a first end of the optical fiber and a light source for directing light into the optical fiber via a first branch of the optical splitter. A photo detector receives light conveyed through the optical fiber via a second branch of the optical splitter and measures an intensity of the received light. A reflective target supported at a second end of the hollow body is axially aligned with the second end of the optical fiber in the absence of force. Upon acceleration the cantilever section moves such that its position relative to the reflective target changes thereby reducing the instantaneous intensity of light reflected by the target into the second end of the optical fiber and measured by the photo detector.

8 Claims, 2 Drawing Sheets

FIBER OPTIC ACCELEROMETER

BACKGROUND OF THE INVENTION

1. The Field of the Invention

The present invention relates to fiber optic sensors, particularly to sensors substantially not affected by very strong electromagnetic fields, and in the presence of Radio Frequency interferences produced by power electric generators, high voltage power utilities, electrical transformers and similar equipment.

2. The Relevant Technology

Fiber optic sensors such as accelerometers and pressure, temperature, displacement sensors, etc. are known to use light energy and optical fibers to sense physical parameters and transform measured signals representative of the physical parameters into modulation of light energy. Examples of such sensors are disclosed in U.S. Pat. No. 5,771,091; US 2009/0013112 and US 2007/0247613 in which the sensor includes two optical fibers. One fiber channels light energy from a light source to a sensing object that moves under the influence of sound or vibration/acceleration. The second fiber channels the reflected light energy modulated by these movements to a light detector that produces an electrical sensor output signal.

The disadvantages of such sensors are complexity of their construction and the need for highly qualified personnel for their assembly as well as the need for two optical fibers that further complicate the mounting of the sensor when measuring acceleration of objects. The sensor disclosed in US 2007/0247613 would appear to have very low resolution due to the large distance of light travel between the ends of both optical fibers in a reflecting body constituted by a two-face mirror. This large distance of light travelled also prevents such an accelerometer from detecting high frequencies since the resolution is very poor for high frequency detection. Another drawback of this sensor is that it can measure the acceleration in only one direction perpendicular to the plane of both optical fibers. To measure acceleration in other direction there is a need to use another sensor whose optical fibers are arranged in another orientation. The need for two optical fibers results in high cost both for the sensor itself and for its assembly as well as installation of the sensor on objects owing to the provision of two optical fibers. All of this is a source of high production costs of such sensor as well the high cost of its manufacture.

BRIEF SUMMARY OF THE INVENTION

It is therefore a broad object of the present invention to provide a fiber optic accelerometer having very wide frequency range, high sensitivity, low self-noise and being universal in measurement direction. A further object is to provide such a sensor having a simpler construction making it possible to be formed fully of non-metallic materials such as silica or ceramics to withstand extreme temperatures and being low cost for its production, installation and maintenance.

According to an aspect of the present invention there is provided a fiber optic accelerometer comprising:

a hollow body, an optical fiber having a first end and a second end remote from the first end, said optical fiber being supported toward the second end inside the hollow body so as to form a cantilever section, a fiber optic splitter coupled to the first end of the optical fiber, a light source for directing light into the optical fiber via a first branch of the optical splitter, a photo detector arranged for receiving light conveyed through the optical fiber via a second branch of the optical splitter and measuring an intensity of the received light, and a reflective target disposed within and supported at a second end of the hollow body so as to be axially aligned with the second end of the optical fiber when no force is applied to the accelerometer;

whereby upon vibration or acceleration of the accelerometer the cantilever section moves such that its position relative to the reflective target changes thereby reducing the instantaneous intensity of light reflected by the target into the second end of the optical fiber and measured by the photo detector.

These and other objects and features of the present invention will become more fully apparent from the following description and appended claims, or may be learned by the practice of the invention as set forth hereinafter.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 4a, 4b and 4c show schematically different constructions of targets for reflecting light wherein FIG. 4a shows an optical fiber with a slanting cut; FIG. 4b is an optical fiber with a stepped cut; and FIG. 4c is useful for explaining a principle of changing the direction of measuring acceleration;

DETAILED DESCRIPTION OF THE PREFERRED EMBODIMENTS

With specific reference now to the figures in detail, it is stressed that the particulars shown are by the way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more details than necessary for fundamental understanding of the invention, the description taken with the drawings making apparent to those skilled in the art how the several forms of the invention may be embodied in practice.

In the following description of some embodiments, identical components that appear in more than one figure or that share similar functionality will be referenced by identical reference symbols.

Figure 1:
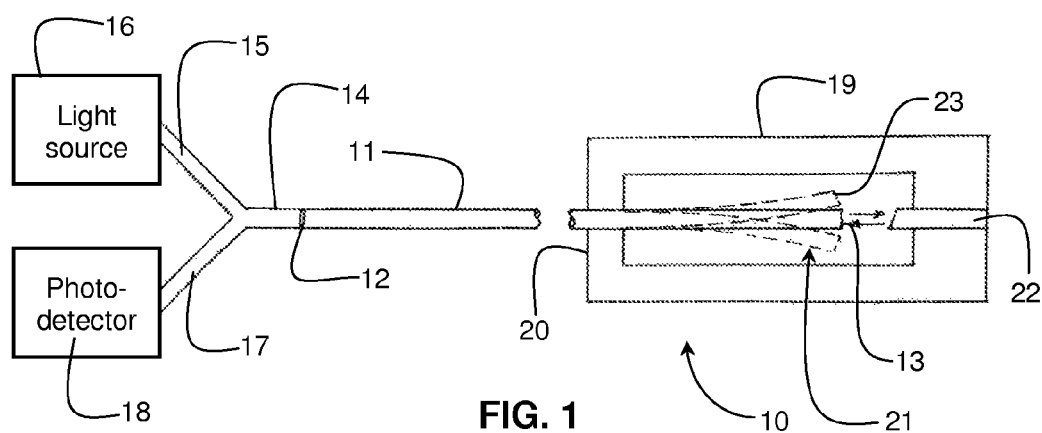
FIG. 1 shows schematically a fiber optic accelerometer constructed and operating according to the present invention.

FIG. 1 is a schematic illustration of a fiber optic accelerometer 10 constructed and operating according to present invention. The accelerometer 10 includes an optical fiber 11 having a first end 12 constituting an input/output and a second end 13. The first end 12 is fixed to a fiber optic splitter 14, to a first branch of which is coupled a first fiber 15 having a light source 16 at its end and to whose second branch is coupled a second fiber 17 with a photo detector 18 at its end. The accelerometer 10 has a generally hollow body portion 19 having an end wall 20 through which the fiber 11 protrudes and by which it is supported so that toward the second end 13 of the fiber there is formed a short cantilever section 21 that is capable of deflection consequent to vibration or acceleration of the body 19. The cantilever section 21 thus spans a short section of optical fiber within the hollow body between the second end and the point of fixation of the optical fiber which serves as an acceleration sensor. The length of the optical fiber outside of the hollow body portion 19 may be kilometers in length. A reflective target 22 is affixed within the hollow body to an inside surface of an opposite end wall in axial alignment with the optical fiber when in its rest or equilibrium position.

Light from the light source 16 is conveyed through the optical fiber 15 via the first branch of the light splitter 14 to the optical fiber 11 whence it is directed to the second end 13. Light emitted from the free end 13 strikes the reflective target 22, which reflects a portion of the light back to the second end 13 of the optical fiber 11. The reflected light striking the second end 13 is conveyed through the optical fiber 11, via the second branch of the fiber optic splitter 14 and the fiber 17 into the photo detector 18, which measures the intensity of the reflected light.

When the accelerometer body 19 vibrates or accelerates the second end 13 of the cantilever section 21 swings up and down about its point of attachment and moves to an off-axis location 23, thus changing its position relative to the light reflective target 22. This means that the instantaneous intensity of the light conveyed by the free end of the optical fiber toward the target 22 is reduced, as is the instantaneous intensity of the light reflected by the target 22 to the optical fiber. As a result, the intensity of light reaching the photo detector 18 changes according to the vibration/acceleration of accelerometer body 19 and the output signal of photo detector 18 changes as a function of the acceleration.

Figure 2:
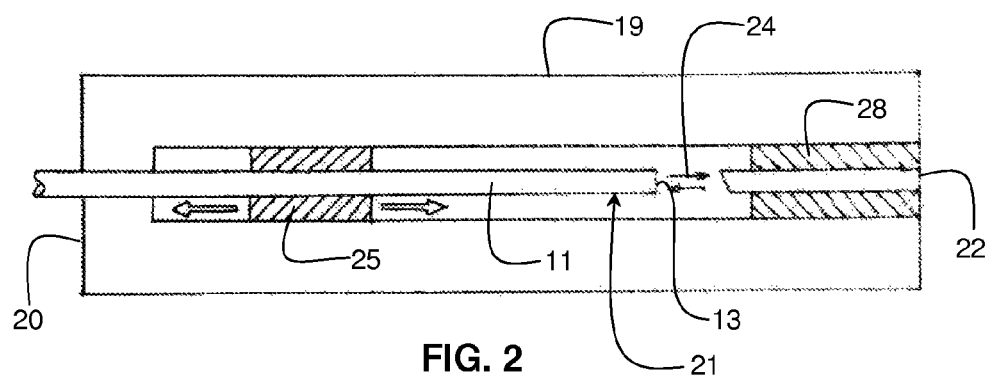
FIG. 2 shows schematically a partial cross-sectional view of the fiber optic accelerometer depicted in FIG. 1 with the possibility to change the mounting point of an optical fiber in the accelerometer body.

FIG. 2 shows schematically a partial cross-sectional view of an accelerometer 10 according to another embodiment wherein the length of the cantilever section 21 is adjustable. As in the previous embodiment, the optical fiber 11 is firmly fixed toward one end in the accelerometer body 19 so as to form a cantilever section 21 having free inertial movement relative to the body 19 and being configured to change its position relative to the reflective target 22 that is fixed opposite the free end 13 of the optical fiber 11 coaxially therewith. The target is illuminated by light 24 emanating from the moving second end 13 of the optical fiber. Light 24 is partially reflected back by the target 22 toward the free second end 13 and conveyed by the optical fiber via the second branch of the fiber optic splitter 14 and the fiber 17 into the photo detector 18. As the position of the free second end 13 changes relative to the target 22, the intensity of the light reflected back by the target 22 into the free second end 13 of the optical fiber changes accordingly.

FIG. 2 demonstrates that the effective length of the cantilever section 21 is adjustable. To this end, the fixed end of the optical fiber is not anchored by the end wall of the body 19 but rather by a slidable mount 25 that may be moved horizontally so as to change the length l of the cantilever section 21, thereby changing the amplitude of its free movement, and thus the sensitivity and frequency range of the accelerometer. The relationship between the length of the cantilever section 21 and the natural resonance and amplitude of its free movement may be determined by the equation:

$$\ell = 0.43 * \sqrt[4]{\left(\frac{E*d^2}{r*f^2}\right)} \quad (1)$$

$$s = 20 * \ell^4 * \frac{r}{E*d^2} \quad (2)$$

$$s = \frac{0.7}{f^2} \quad (3)$$

where:
  l is the length of the cantilever section of the optical fiber (m);
  S is the sensitivity (i.e. the deflection of the free end of the fiber under the acceleration of 1 g) (m/g);
  d is the diameter of the optical fiber (m);
  r is the density of the optical fiber material (kg/m$^3$);
  E is the Young's modulus of the fiber material (N/m$^2$);
  f is the natural resonant frequency of the accelerometer (Hz).

Figure 3:
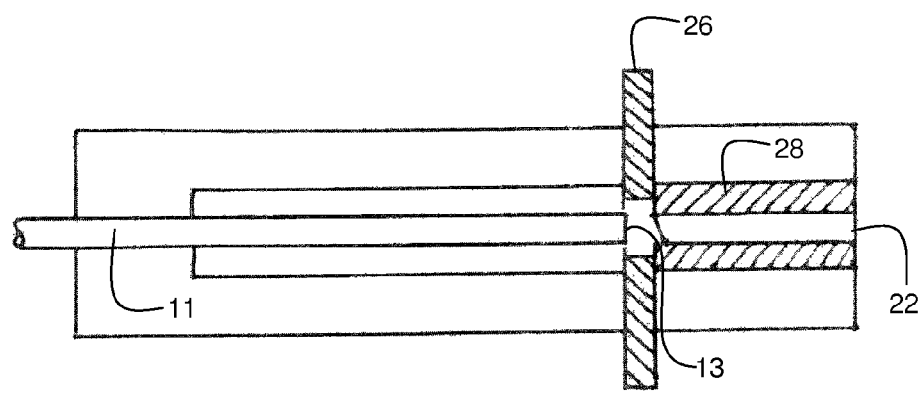
FIG. 3 is a schematic partial cross-sectional view of the fiber optic accelerometer with the spacing between the free end of the optical fiber and the reflective back target.

FIG. 3 is a schematic partial cross-sectional view of a fiber optic accelerometer according to yet another embodiment where an annular spacer 26 having a central aperture is disposed between the second end 13 of the optical fiber and the reflective target 22. The spacer 26 is dimensioned to ensure that the distance between the free end of the optical fiber and the facing end of the stub is in the order of 10-15 μm. The central aperture ensures that the spacer allows the light to pass through unimpeded. The distance between the end 13 of the optical fiber 11 and the reflective target 22 determines the sensitivity of the accelerometer. The optimal distance is set using the spacer 26 during accelerometer assembly.

Figure 4A:
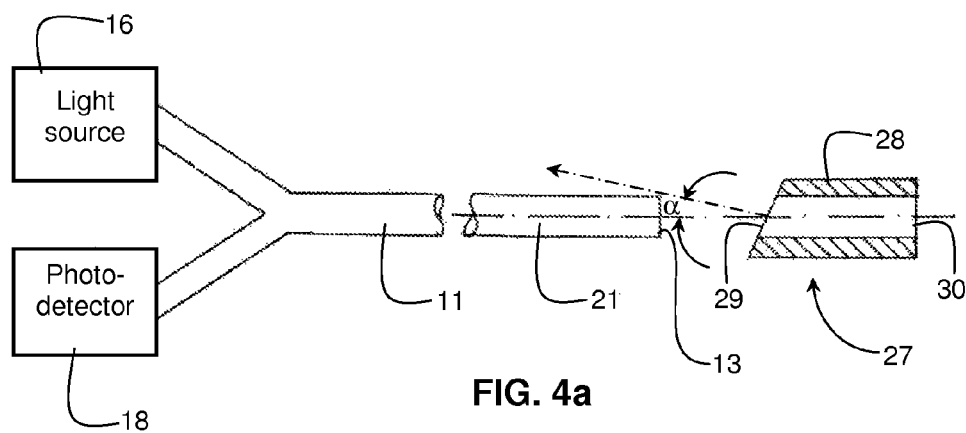
Figure 4B:
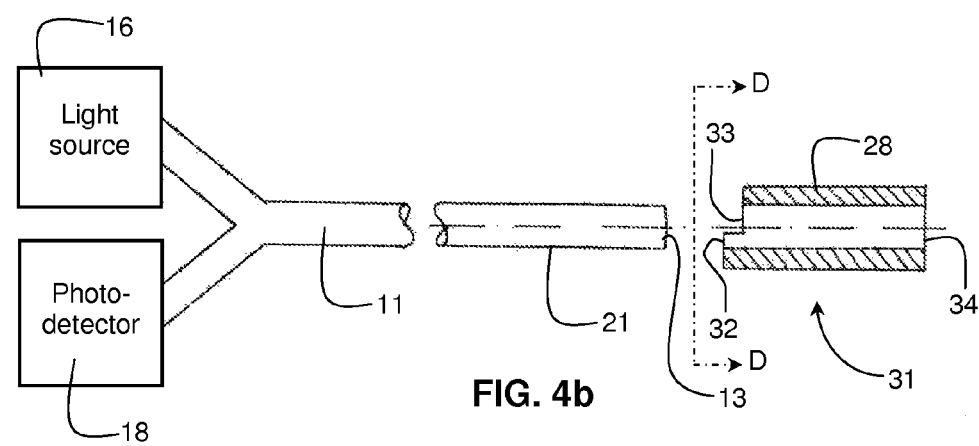
Figure 4C:
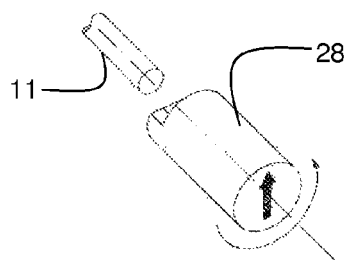

FIGS. 4a, 4b and 4c show schematically different constructions of light reflective targets that are all formed from sections of optical fiber.

In FIG. 4a the target is formed of an optical fiber stub 27 that is fixed inside a ferrule 28 and whose end is chamfered to form a slanted reflecting surface 29. The rear end 30 of the optical fiber 27 stub is coated with a highly polished efficient light reflecting material such as gold so as to form a good reflecting surface. The optical fiber 11 and the optical fiber stub 27 are coaxial in the equilibrium state of the accelerometer. Light from the light source 16 conveyed through the optical fiber 11 and emerging from the moving second end 13 thereof is directed into the optical fiber stub 27 and reflected by its rear end 30 back through the optical fiber stub 27. Some of this light enters the second end 13 of the optical fiber 11, through which it is conveyed via the second branch of the fiber optic splitter 14 and the fiber 17 on to the photo detector 18.

When subjected to vibration/acceleration, the free second end 13 of the optical fiber 11 changes its position and the quantity of light fed by the optical fiber 11 into the optical fiber stub 27 and reflected back into the optical fiber 11 will change as well. The more the optical fiber 11 deflects from the common axis with the optical fiber stub 27, the less will be the quantity of light reflected back into the optical fiber 11. The angular disposition of the slanted end surface of the optical fiber stub 27 relative to the second end surface 13 of the optical fiber 11 renders the accelerometer sensitive to the direction of movement of the optical fiber 11. Specifically, in the equilibrium position shown in FIG. 4a, light transmitted by the end 13 of the optical fiber 11 into the stub 27 is reflected at an angle α, which is inside the capture angle of the optical fiber 11 aperture. Therefore, if the cantilever section 21 is subjected to horizontal vibration into and out of the plane of the paper, the intensity of the light reflected by the stub 27 will not change. Conversely, if the cantilever section 21 is subjected to vertical vibration in the plane of the paper, then when the end 13 of the cantilever section 21 moves down, more of the light reflected by the stub 27 will re-enter the optical fiber 11 and be detected by the photo detector 18. But when the cantilever section 21 moves upward, less of the light reflected by the stub 27 will re-enter the optical fiber 11 and be detected by the photo detector 18. So the angular orientation of the reflective target formed by the optical fiber stub 27 will determine the vector of measuring vibration/acceleration of the sensor.

FIG. 4b shows another embodiment of a light reflective target. In this case the target is made of an optical fiber stub 31 whose front surface is stepped or recessed close to the free second end 13 of the optical fiber 11 so as to present a lower surface portion 32 closer to the end 13 of the optical fiber 11 and an upper surface section 33 that is somewhat more remote therefrom. As in the previous embodiment, the optical fiber 11 and the optical fiber stub 31 are optically coaxial in the equilibrium state of the accelerometer. A rear surface 34 of the optical fiber stub 31 is coated with a highly polished efficient light reflective material such as gold so as to form a good reflecting surface. Light from the optical fiber 11 is directed into the optical fiber stub 31 and is reflected from its rear surface 34 back into the fiber 11 by which it is conveyed via the second branch of the fiber optic splitter 14 and the fiber 17 on to the photo detector 18. During vibration or acceleration of the device, the free second end 13 of the optical fiber 11 deviates from its equilibrium axis and the quantity of light that is reflected back changes.

FIG. 4c shows how the orientation of the longitudinal axis of the accelerometer 10 can be changed by rotating the ferrule 28 only so as to adjust the maximal sensitivity of the device with no other changes being required to the remaining elements of the accelerometer.

Figure 4D:
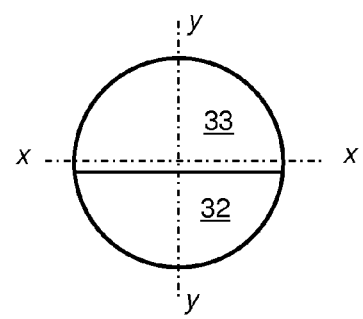
FIG. 4d is a front elevation of the target in FIG. 4a in the direction of line D-D showing the relationship between sensitivity and the plane of the stepped cut.
Figure 4E:
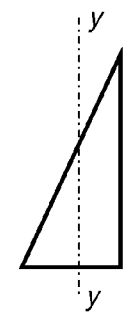
FIG. 4e is a partial side elevation of the target in FIG. 4a showing the relationship between sensitivity and the plane of the slanted surface.

FIG. 4d is an elevation in the direction of line D-D in FIG. 4b for explaining the relationship between sensitivity and the plane of the stepped cut. The plane of the stepped cut determines the direction of maximum sensitivity of the sensor. Thus, sensitivity is minimum in the direction x-x and is maximum in the direction y-y. FIG. 4e is a partial side elevation of the target in FIG. 4a showing that maximum sensitivity is in the direction of the slanted surface as depicted by line y-y.

The inventive concept enshrined by the invention and defined in the claims is the securing of a short section of the optical fiber as a cantilever section, which is subjected to vibrations and in so doing chops the light reflected into the target and received thereby.

This notwithstanding, for the sake of completeness we provide a mathematical relationship between measured light intensity and acceleration that may be used as a non-limiting function to derive acceleration from the measured signals.

$$\frac{I}{I_o} = \frac{1}{2\pi}\left(\frac{r}{R+2t\cdot NA}\right)^2\left(\frac{2\pi\cdot arccos\left(\frac{D}{r}\right)}{180} - \sqrt{1-\left[2\left(\frac{D}{r}\right)^2-1\right]^2}\right) \quad (4)$$

where:
$I_o$ is intensity of light source fed into first end of optical fiber;
I is intensity of light returned by target into second end of optical fiber and measured by the photo detector;
D is the deflection of the second end of the optical fiber when subjected to acceleration A;
t is the spacing between the second end of the optical fiber and the reflecting target. This corresponds to the thickness of the annular spacer in FIG. 3;
NA is the numerical aperture of the optical fiber; and
r is the radius of the optical fiber.

Equation (4) may be combined with Equation (2) in order to solve for acceleration since the deflection D as derived from Equation (4) is equal to S.A where S is the sensitivity as derived from Equation (2). This allows the acceleration A to be computed from the measured light intensities.

It will be evident to those skilled in the art that the invention is not limited to the details of the foregoing illustrated embodiments and that the present invention may be embodied in other forms without departing from the essential attributes thereof. The present embodiments are therefore to be considered in all respects as illustrative, the scope of the invention being indicated by the appended claims rather than by foregoing description.

What is claimed is:
1. A fiber optic accelerometer comprising:
a hollow body,
an optical fiber having a first end and a second end remote from the first end, said optical fiber being supported toward the second end inside the hollow body so as to form a cantilever section,
a fiber optic splitter coupled to the first end of the optical fiber,
a light source for directing light into the optical fiber via a first branch of the optical splitter,
a photo detector arranged for receiving light conveyed through the optical fiber via a second branch of the optical splitter and measuring an intensity of the received light, and
a reflective target disposed within and supported at a second end of the hollow body so as to be axially aligned with the second end of the optical fiber when no force is applied to the accelerometer;
whereby upon vibration or acceleration of the accelerometer the cantilever section moves such that its position relative to the reflective target changes thereby reducing the instantaneous intensity of light reflected by the target into the second end of the optical fiber and measured by the photo detector;
wherein:
the reflective target is formed of an optical fiber stub having a first end proximate the free second end of the optical fiber and a second end remote therefrom; and
the first end of the optical fiber stub has a slanted surface formed at an angle to an optical axis of the optical fiber stub and the second end of the optical fiber stub is cut perpendicularly to said optical axis and is coated with a highly polished efficient light reflecting material.

2. The fiber optic accelerometer as claimed in claim 1, wherein a point of fixation of the optical fiber in the hollow body is adjustable thereby allowing adjustment of the length of the cantilever section.

3. The fiber optic accelerometer as claimed in claim 1, wherein a distance between the second end of the optical fiber and the light reflective target is fixed by an annular spacer during assembly.

4. The fiber optic as claimed in claim 1, wherein the optical fiber stub is axially rotatable so as to change an orientation of the slanted surface of the first end of the optical fiber stub thereby adjusting a directional sensitivity of the accelerometer.

5. A fiber optic accelerometer comprising:
a hollow body,
an optical fiber having a first end and a second end remote from the first end, said optical fiber being supported toward the second end inside the hollow body so as to form a cantilever section,
a fiber optic splitter coupled to the first end of the optical fiber,
a light source for directing light into the optical fiber via a first branch of the optical splitter,
a photo detector arranged for receiving light conveyed through the optical fiber via a second branch of the optical splitter and measuring an intensity of the received light, and
a reflective target disposed within and supported at a second end of the hollow body so as to be axially aligned with the second end of the optical fiber when no force is applied to the accelerometer;
whereby upon vibration or acceleration of the accelerometer the cantilever section moves such that its position relative to the reflective target changes thereby reducing the instantaneous intensity of light reflected by the target into the second end of the optical fiber and measured by the photo detector;
wherein:
the reflective target is formed of an optical fiber stub having a first end proximate the free second end of the optical fiber and a second end remote therefrom; and
the first end of the optical fiber stub has a stepped cut so as to present a first surface portion closer to the end of the optical fiber and a more distant second surface section and the second end of the optical fiber stub is cut perpendicularly to said optical axis and is coated with a highly polished efficient light reflecting material.

6. The fiber optic accelerometer as claimed in claim 5, wherein a point of fixation of the optical fiber in the hollow body is adjustable thereby allowing adjustment of the length of the cantilever section.

7. The fiber optic accelerometer as claimed in claim 5, wherein a distance between the second end of the optical fiber and the light reflective target is fixed by an annular spacer during assembly.

8. The fiber optic as claimed in claim 5, wherein the optical fiber stub is axially rotatable so as to change an orientation of the stepped surface of the first end of the optical fiber stub thereby adjusting a directional sensitivity of the accelerometer.

\* \* \* \* \*